(12) United States Patent
Tavivian

(10) Patent No.: US 6,581,342 B1
(45) Date of Patent: Jun. 24, 2003

(54) BLAST PROTECTIVE WINDOW

(75) Inventor: Aharon Tavivian, Omer (IL)

(73) Assignee: T.D. Industries Ltd., Beer Sheva (IL)

( * ) Notice: Subject to any disclaimer, the term of this patent is extended or adjusted under 35 U.S.C. 154(b) by 0 days.

(21) Appl. No.: 09/455,809

(22) Filed: Dec. 7, 1999

(30) Foreign Application Priority Data

Dec. 7, 1998 (IL) .................................................. 127424

(51) Int. Cl.[7] .............................................. E06B 3/66
(52) U.S. Cl. ........................... 52/204.595; 52/204.597; 52/204.62; 52/208; 52/786.1; 428/34; 156/106
(58) Field of Search ................................ 52/171.3, 172, 52/204.591, 204.597, 204.593, 204.595, 204.62, 786.1, 786.13, 208; 428/34, 38; 156/106

(56) References Cited

U.S. PATENT DOCUMENTS

| 2,094,435 A | * | 9/1937 | Toney ....................... 52/208 X |
| 2,264,176 A | * | 11/1941 | Englehart et al. ... 52/204.591 X |
| 2,525,717 A | * | 10/1950 | Ottenheimer ...... 52/204.591 X |
| 3,889,434 A | * | 6/1975 | Shelver ...................... 52/172 |
| 4,006,569 A | | 2/1977 | Kain |
| 4,055,031 A | * | 10/1977 | Okawa et al. ................. 52/172 |
| 4,134,238 A | * | 1/1979 | Auger .......................... 52/127 |
| 4,240,235 A | * | 12/1980 | Nawa .......................... 52/397 |
| 4,295,305 A | * | 10/1981 | Shelver ....................... 52/172 |
| 4,364,209 A | | 12/1982 | Gebhard |
| 4,636,421 A | * | 1/1987 | Hotovy ...................... 428/156 |
| 4,669,241 A | | 6/1987 | Kelly |
| 4,984,402 A | | 1/1991 | Davies |
| 5,356,675 A | | 10/1994 | Unger et al. |
| 5,778,629 A | * | 7/1998 | Howes ..................... 52/786.11 |
| 5,806,256 A | * | 9/1998 | Byrne ............... 52/204.591 X |
| 5,853,828 A | * | 12/1998 | Schimmelpenningh et al. .. 428/34 |
| 5,979,932 A | * | 11/1999 | Jourdaine et al. ........ 280/730.2 |

FOREIGN PATENT DOCUMENTS

EP 064583 * 3/1982 .................. 52/208

* cited by examiner

*Primary Examiner*—Lanna Mai
*Assistant Examiner*—Winnie Yip
(74) *Attorney, Agent, or Firm*—Banner & Witcoff, Ltd.

(57) ABSTRACT

The invention provides: a multi-layer security glazing unit for resisting actions of force, comprising a pair of spaced-apart glass panels provided with a reinforcing resin material there between and sealed together along at least one common edge thereof by an adhesive material within a rigid clamping channel of substantially U-shaped cross-section.

14 Claims, 5 Drawing Sheets

BLAST PROTECTIVE WINDOW

BACKGROUND OF THE INVENTION

The present invention relates to a blast-protective window construction. More particularly, the invention provides improved glazing for such a window, which reduces assembly time, in some embodiments eliminates the use of liquid sealant during assembly on site, and most important—improves the resistance of the glass panels to separation from the window frame in response to a blast force.

Many types of glazing systems are known. An example of a simple design intended primarily for the framing of mirrors is the panel mounting proposed by Kain in U.S. Pat. No. 4,006,569. A much more complex design intended to cope with various dimensional irregularities, thermal problems and condensation is disclosed by Unger et al in U.S. Pat. No. 5,356,675.

There are advantages in providing a glazing sub-frame, holding the glass panel, which sub-frame can be fast assembled either at the factory or on the building site to a window frame. For example, the window frame can be joined to the building by workmen who may be less than careful before any glass is brought to the building site, and the glass in its sub-frame is made In the factory and added shortly before completion of construction. A design of, this type is proposed by Gebhard in U.S. Pat. No. 4,364,209. He describes a window frame having a J-shaped channel into which is inserted the glazing strip which has a flexible leg locking into the window frame.

Many glazing arrangements require extensive use of a liquid sealant on site.

Older methods required the use of putty. The on-site use of such sealants is preferably to be avoided, due to delays caused by alloying drying time, mess on site and the difficulties of quality control outside the factory.

The above-mentioned designs are unsuitable for, and indeed not intended for windows required to resist high forces.

One application for high-pressure windows is in viewing underwater events. A further application is in viewing hazardous industrial or laboratory operations where there is a danger of an explosion occurring.

For general civilian use blast protective windows ark designed to withstand explosive blast forces to a level usually determined by standards set by governments or local authorities. Security windows are used in buildings which may be subject to terrorist attacks, in bomb shelters, and in recent years have also come into extensive use in residential buildings provided with security rooms. Such rooms are part of the living quarters of a house or flat, and although reinforced to withstand a high degree of blast forces, and sealable against external gases, the general appearance of such rooms is reasonably similar to that of other rooms in the same building.

In residential areas blast protective windows are suspended from a sill frame by hinges and are designed to be openable, and when closed to be sealed against entry of gases, such sealing providing protection also against liquids.

A known weakness of prior art blast protective windows is that under the extreme pressures resulting from an explosive blast the glass is shattered, but the fragments are still retained as one sheet by means of a plastic covering or sandwiched flexible sheet. The glass is then pulled out of the frame, as due to deformation of the broken sheet the outer dimensions of the sheet suffer size reduction. Prior art designs fail to make adequate provision for preventing such extraction of the glass from the window frame. Obviously, when such broken sheet fails to be retained in its frame the sheet itself may cause injury to persons in its vicinity.

SUMMARY OF THE INVENTION

It is therefore one of the objects of the present invention to obviate the disadvantages of prior art glazing systems for blast resistant windows and to provide a system which improves resistance to extraction of the glass from the window frame.

It is a further object of the present invention to separate the glazing operation from window frame construction and thus reduce the; need for skilled on-site labor.

The present invention achieves the above objects by providing a multi-layer security glazing unit for resisting actions of force, comprising a pair of spaced-apart glass panels provided with a reinforcing resin material therebetween and sealed together along at least one common edge thereof by an adhesive material within a rigid clamping channel of substantially U-shapes cross-section.

In a preferred embodiment of the present invention there if provided a blast-protective window, comprising:
  a) a multi-layer security glazing unit in combination with
  b) a window frame joined and sized to receive and surround said glazing unit; said window frame comprising:
    (i) a main framework of vertical and horizontal elements extending in a general plane of a substantially vertical orientation;
    (ii) an auxiliary backing framework also extending in a general plane of a substantially vertical orientation, said auxiliary backing framework at least partly protruding across the opening defined by said main framework for at least indirectly supporting a first face of said glazing unit, said main framework and said auxiliary framework being integrally joined, and together having a substantially L-shaped cross-section along the surrounding common edge thereof, and
    (iii) a clamping element adapted to be attached to said main framework with a surface thereof adjacent to, and at least indirectly supporting a second face of said glazing unit.

In a most preferred embodiment of the present invention there is provided a blast-protective window wherein the auxiliary backing framework and the clamping elements are each provided with a stepped surface. Upon assembly the distance between the interfacing inner surfaces of the backing framework and the clamping element supporting the faces of the glazing unit is less than the distance between the portions of the backing framework and the clamping element adjacent to the rigid clamping channel.

Yet further embodiments of the invention will be described hereinafter.

It will thus be realized that the novel glazing system of the present invention serves to secure the glass sheets to a U channel, which U channel is quite easily retained in the window frame and is firmly restrained from extraction by shoulders or ledges integral to the frame.

Furthermore, the primary glazing operation, involving the use of a liquid sealant filling the rigid U channel and gripping the glass therein, need not be carried out at the construction site but in the factory, where such work can be better controlled and executed. The glass, together with its sub-frame is best transported to the building site just before the building is being completed, and is thus protected from the dangers of ongoing construction activities. The workmen installing the window frame in the building wall can carry out their task without concern for the glass. In some embodiments of the present invention, the window pane with its sub frame may be installed without requiring the use on site of liquid sealants.

DETAILED DESCRIPTION

The invention will now be described in connection with certain preferred embodiments with reference to the drawings so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
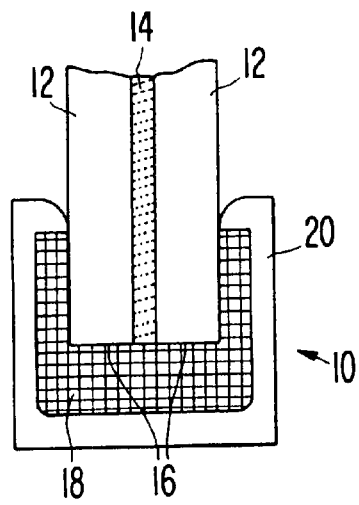
FIG. 1 end view of a preferred embodiment of the multi-layer security glazing unit according to the invention.

There is seen in FIG. 1 a multi-layer security glazing unit 10 configured for resisting actions of force, and retaining glass sheets in a frame under high fluid or gas pressure.

A pair of spaced-apart glass panels 12 are provided with a reinforcing resin material 14, for example polycarbonate, therebetween.

The panels 12 are sealed together along at least one common edge 16 thereof by an adhesive material 18, advantageously a silicon compound. The material 18 is contained and sets within a rigid clamping channel 20, of substantially U-shaped cross-section.

The adhesive material 18 serves both to support the glass panels 12 in a flexible manner, and also to grip the edges of the glass panels so that retention of the channel 20 in a framework, to be described with reference to FIG. 4, causes corresponding retention of the glass panels 12.

Suitably the rigid clamping channel 20 is made of a metal, for example an aluminium alloy extrusion.

With reference to the rest of the figures, similar reference numerals have been used to identify similar parts.

Figure 2:
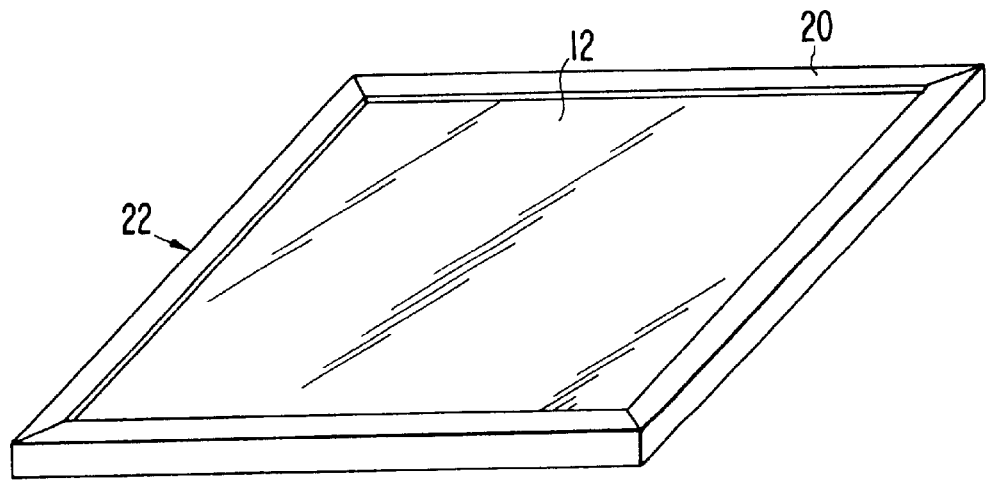
FIG. 2 is a perspective view of a glazing unit.

Referring now to FIG. 2, there is seen a multi-layer security glazing unit 22 wherein the surrounding common peripheral edge of the panels 12 and resin material 14, seen in FIG. 1, are sealed together by an adhesive material 18 within the clamping channel 20. The clamping channel 20 forms an edging frame for the unit. The unit 22 is advantageously factory manufactured separate from the window frame, seen in FIG. 4, in which it is to be inserted, thus saving on-site labor.

Figure 3:
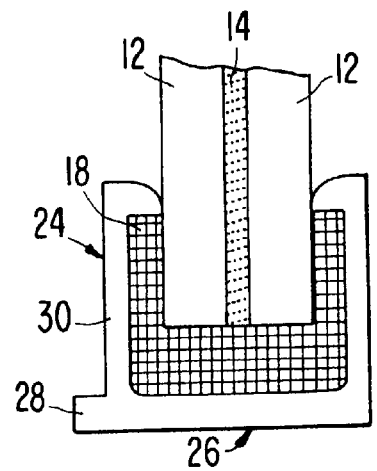
FIG. 3 is a end view of a second embodiment of the glazing unit.

FIG. 3 illustrates a further embodiment of a multi-layer security glazing unit 24. The rigid clamping channel 26 is provided with a ledge-like flange 28 projecting substantially perpendicular to the general plane of an arm 30 thereof. The flange 28 projects beyond an outside face of a major surface of arm 30.

Figure 4:
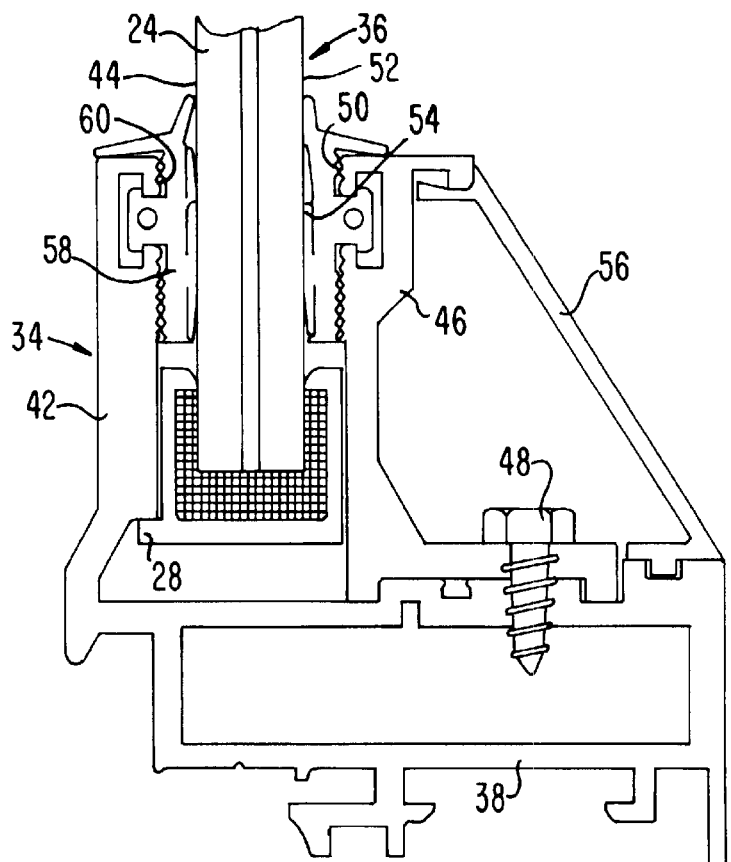
FIG. 4 is a sectional view of a blast-protective window.

When assembled to a window frame, seen in FIG. 4, the flange 28 underrides an abutment surface 32 provided along an inner side of a window framework 34. Thus the flange 28 reinforces securing of the glazing unit 24 in a window framework 34 and prevents its extraction when subjected to a blast force.

Seen in FIG. 4 is a blast-protective window 36.

The window 36 holds a multi-layer security glazing unit 24 as described with reference to FIG. 3.

The window frame 34 is joined and sized to receive and surround the glazing unit 24.

The window frame 34 comprises a main framework 38 of vertical and horizontal elements extending in a general plane of a substantially, vertical orientation. The framework 38 has an arm 40 for sealing against a further framework or wall.

The window frame 34 includes an auxiliary backing framework 42 also extending in a general plane of a substantially vertical orientation. The auxiliary backing framework 42 partly protrudes across the opening defined by the main framework for at least indirectly supporting a first face 44 of the glaring unit 24.

The main framework 38 and auxiliary framework 42 are integrally joined, typically being extruded as a single profile. The two frameworks 38, 42 together have a substantially L-shaped cross-section along the surrounding common edge thereof.

A clamping element 46 is adapted to be attached by means of screws 48 to the main framework 38. A surface thereof 50 is adjacent to, and supports a second face 52 of the glazing unit 24 via an elastomeric seal strip 54.

A sloping non-structural cover 56 hides the screws 48.

Sealing the window 36 against dangerous gases and liquids is preferably achieved by use of an elastomeric seal 58 positioned between an inwardly facing surface 60 of the auxiliary backing framework 42 and the first first 44 of glazing unit 24. Similarly, sealing is further improved by use of the elastomeric seal 54.

Figure 5:
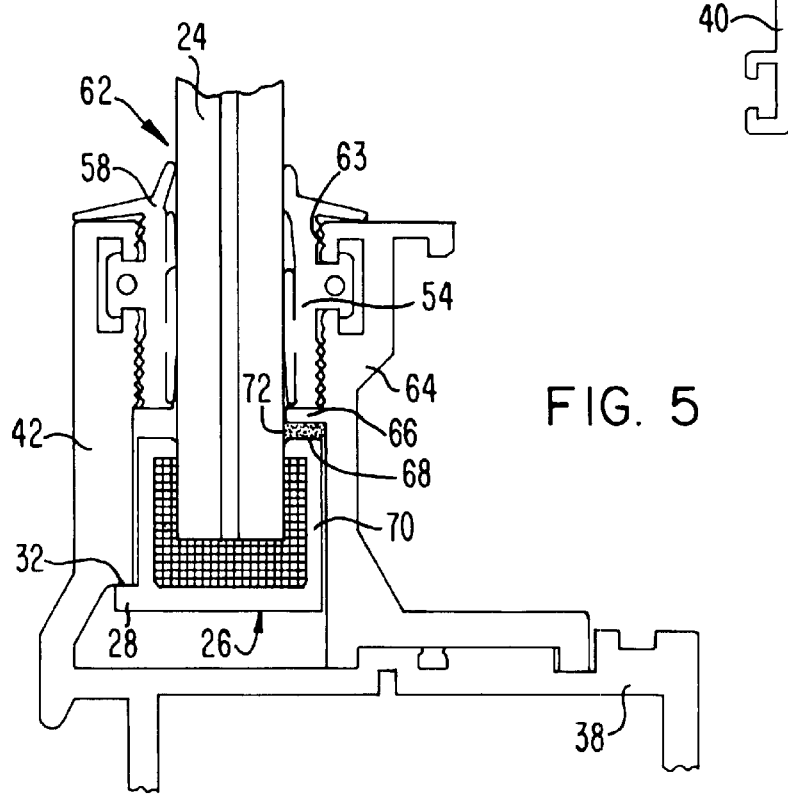
FIGS. 5, 6, 7, 8 & 9 are sectional views of further embodiments of the blast protective window.

Referring now to FIG. 5, there is depicted a blast-protective window 62 wherein the surface 63 of the clamping element 64 adjacent to seal element 54 is provided with a flange-like projection 66. This serves for abutting an upper surface 68 of an arm 70 of the rigid clamping channel 26.

In the preferred embodiment shown in the figure, an elastomeric damping material 72 is introduced between the upper surface 69, and projection 66 of the clamping element 64. The elastomeric damping material 72 serves to evenly spread the stress of a blast force on the glass panels of the glazing unit 24 and thus increase the blast pressure which can be successfully withstood by the window 62.

Figure 6:
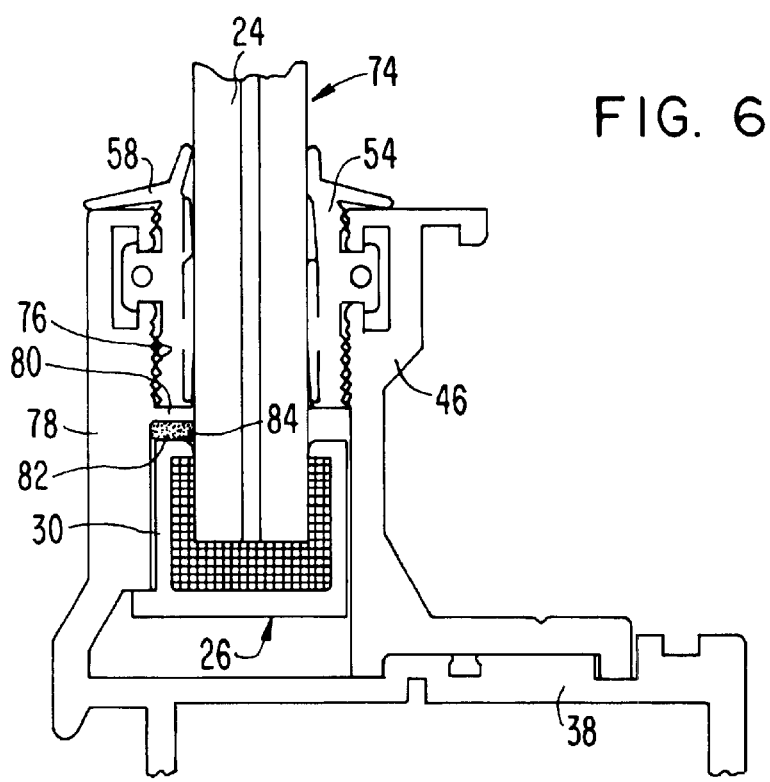

FIG. 6 shows an arrangement similar to that shown in FIG. 5 being used on the other side of the glass.

A blast-protective window 74 has an inwardly facing surface 76 of an auxiliary backing framework 78. It is provided with a flange-like projection 80 for abutting an upper surface 82 of an arm 30 of the rigid clamping channel 26.

Preferably an elastomeric damping material 84 is introduced between the upper surface 82 and projection 80.

Figure 7:
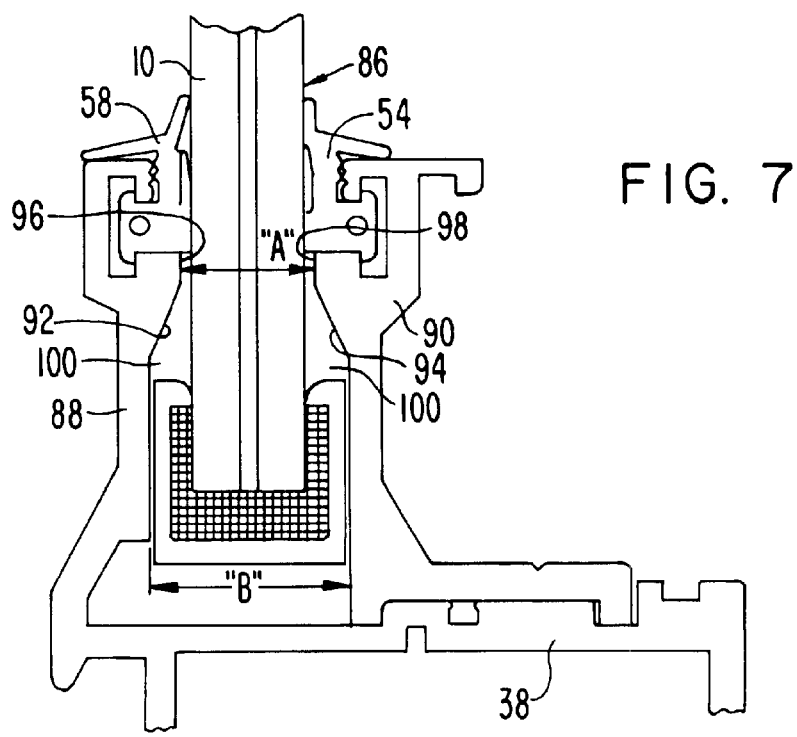

FIG. 7 illustrates a further embodiment of a blast-protective window 86. The auxiliary backing framework 88 and the clamping element 90 are each provided with a stepped surface 92, 94. Upon assembly, there is a distance "A" between the interfacing inner surfaces 96, 98 of the backing framework 88 and the clamping element 90 supporting the faces of the glazing unit 10.

Distance "A" is less than the distance "B" between they, portions of the backing framework 88 and the clamping element 90 adjacent to the rigid clamping channel 20. Consequently, the glazing unit 10 cannot be pulled out before causing severe deformation of the metal framework 88 and/or clamping element 90, which provides adequate resistance to being so deformed.

Advantageously a space 100 is provided between the stepped surfaces 92, 94 and the rigid clamping channel 20. The space 100 allows a small amount of initial movement as the unit 10 attempts to disengage as result of blast forces, before offering resistance, thus helping in dissipating stress concentrations before the channel 20 locks against the stepped surfaces 92, 94.

Figure 8:
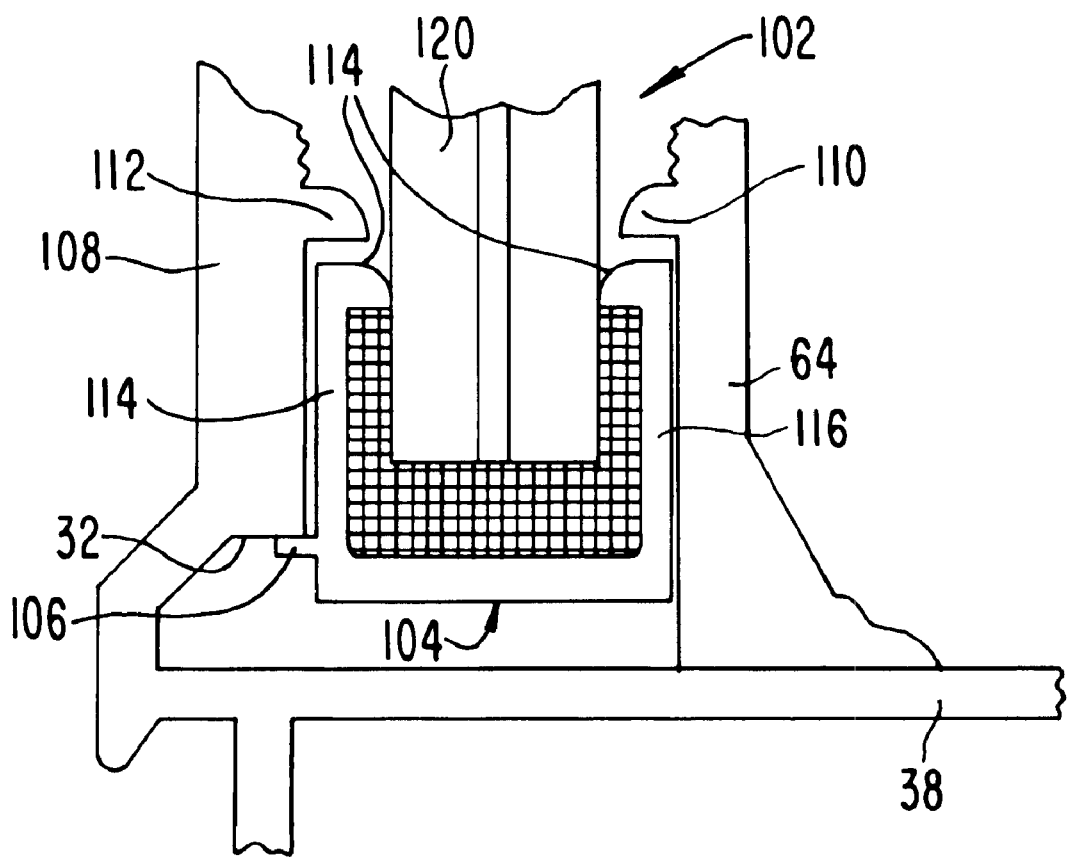

Seen in FIG. 8 is a further embodiment of a blast-protective window 102.

The rigid clamping channel 104 is provided with a flexible ledge-like flange 106 projecting substantially perpendicular to the general plane of an arm 114, and beyond an outside face of a major surface of this arm.

Flange 106 underrides and contacts an abutment surface 32 provided along an inner side of the auxiliary backing framework 108.

Flange-like projections 110, 112 attached respectively to the inwardly facing surface of clamping element 64 and to inwardly facing surface of the auxiliary backing framework 108 are spaced about 2 to 10 mm apart from the upper surfaces 114 of the arms 116 of the rigid clamping channel 104.

In use, when the window 102 is subjected to a blast forage, the flexible ledge-like flange 106 bends to absorb a part of the glazing unit energy. After a short movement the glazing unit 120 is halted by abutment with flange-like projections 110, 112.

Figure 9:
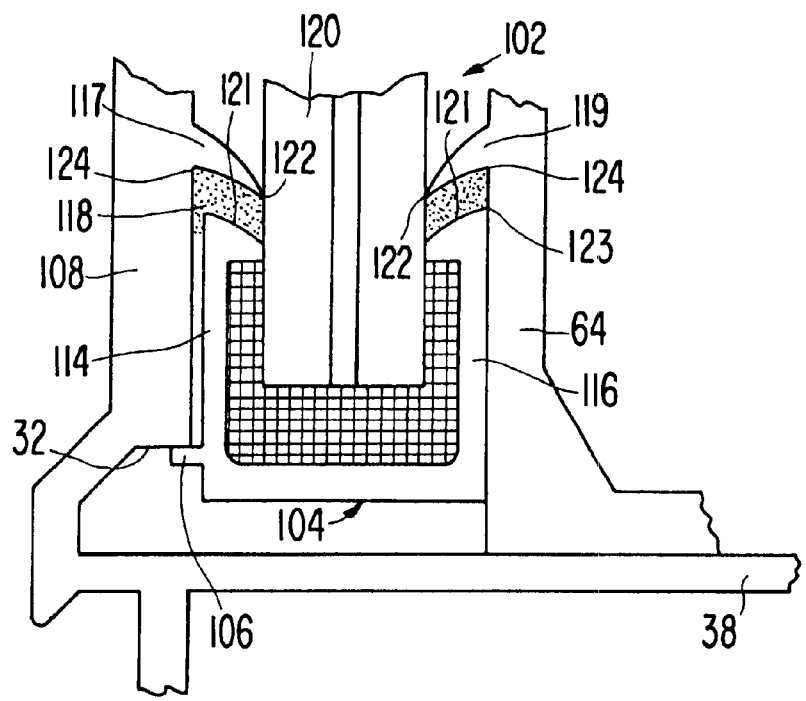

Seen in FIG. 9 is an embodiment generally similar to that seen in FIG. 8 and in which similar reference numerals have been used to identify similar parts. In this embodiment, however, flange-like projections 117 and 119 project inwardly and with a downward slant from the inwardly facing surface of clamping element 64 and the inwardly facing surface of auxiliary backing flamework 108 and have extremities 122 sloping downwards towards the channel 104. The upper surfaces 121 of the arms 114 and 116 of the rigid clamping channel 104 are provided with a slope complimentary to the underside of projections 117 and 119 to effect a better locking interengagement therebetween, wherein the upper outer corner 123 of said surfaces 121 are nestled in the angled juncture 124 between arm 119 and auxiliary backing framework 108 and arm 117 and clamping element 64. Said unit can further be provided with damping material 118 which becomes trapped and compressed upon upper movement of the channel 104.

Figure 10:
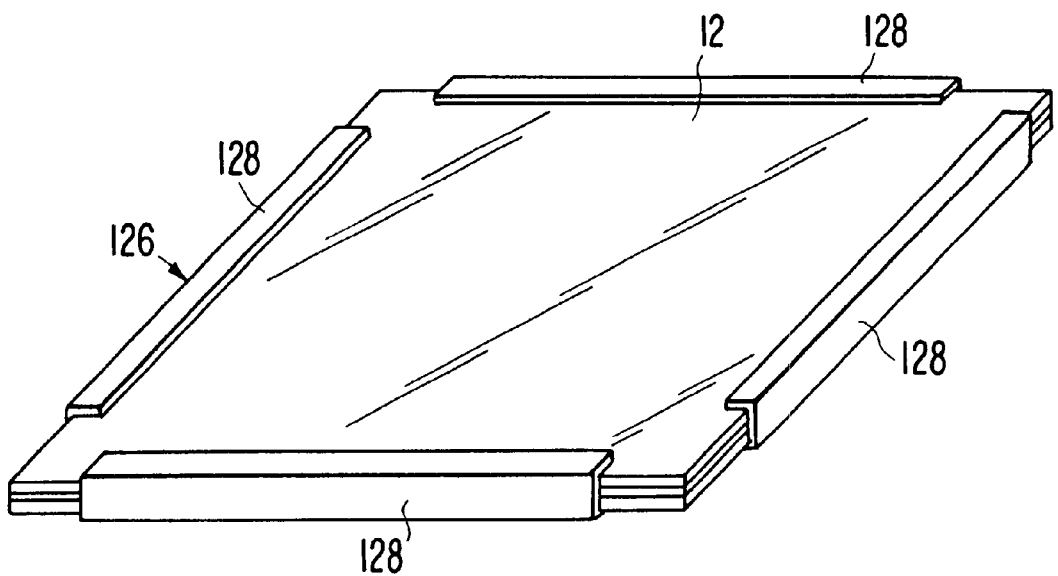
FIG. 10 is a perspective view of a further embodiment of a glazing unit.

FIG. 10 shows an embodiment 126 similar to that seen previously in FIG. 2. The channels, however, are four discreet members 128, which together surround major portions of the common peripheral edges of said resin and panels 12, however do not extend to the corners thereof. The channels 128, being shorter than those shown in FIG. 2, are easier to assemble, as there is no need for corner joints, and the channels do not need to be accurately cut to length.

It will be evident to those skilled in the art that the invention is not limited to the details of the foregoing illustrative embodiments and that the present invention may be embodied in other specific forms without deplarting from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A blast-protective window for resisting actions of force, comprising:

a glazing unit comprising a pair of spaced-apart glass panels and a reinforcing resin material therebetween, the panels having at least two common edges, each of the at least two common edges having a sealed portion comprising adhesive material within a section of a rigid clamping channel of substantially U-shaped cross-section, an outer face of each panel further having a non-channel-enclosed region not enclosed within a clamping channel; and window framework joined and sized to receive and surround said U-shaped rigid clamping channel of said glazing unit, said window framework having a window opening area, wherein said window framework comprises a main framework of vertical and horizontal elements extending in a general plane of a substantially vertical orientation, an auxiliary backing framework also extending in a general plane of a substantially vertical orientation, said auxiliary backing framework at least partly protruding across the opening defined by said main framework for at least indirectly supporting one of the outer faces of said spaced-apart glass panels in the non-channel-enclosed region thereof, said main framework and said auxiliary framework being integrally joined, and together having a substantially L-shaped cross-section along the surrounding common edge thereof, and a clamping element attached to said main framework with a surface thereof adjacent to, and at least indirectly supporting the other outer face of said spaced-apart glass panels in the non-channel-enclosed region thereof, wherein an abutment surface is provided along an inner side of said window framework for reinforced securing of said glazing unit, and said rigid clamping channel is provided with a flange projecting substantially perpendicular to the general plane of an arm of said clamping channel and beyond an outside face of a major surface of said arm for underriding said abutment surface to restrain said clamping channel from movement toward a center of the window opening area, for reinforced securing of said unit in said window framework.

2. A blast-protective window according to claim 1, further comprising at least one elastomeric seal positioned between an inwardly facing surface of said auxiliary backing framework and said one of the outer faces.

3. A blast-protective window according to claim 1, further comprising at least one elastomeric seal positioned between said surface of said clamping element and said other outer face.

4. A blast-protective window according to claim 1, wherein said surface of said clamping element adjacent to, and at least indirectly supporting said other outer face is provided with a projection for abutting an upper surface of another arm of said rigid clamping channel.

5. A blast-protective window according to claim 4, wherein an elastomeric damping material is introduced between said upper surface of said arm of said rigid clamping channel and an adjacent surface of said clamping element.

6. A blast-protective window according to claim 1, wherein an inwardly facing surface of said auxiliary backing framework is provided with a projection for abutting an upper surface of said arm of said rigid clamping channel.

7. A blast-protective window according to claim 6, wherein an elastomeric damping material is introduced between said upper surface of said arm of said rigid clamping channel and an adjacent surface of said auxiliary backing framework.

8. A blast-protective window according to claim 1, wherein said auxiliary backing framework and said clamping elements, are each provided with a stepped surface, and wherein upon assembly the distance between interfacing inner surfaces of the stepped surfaces of said backing framework and said clamping element supporting the non-channel-enclosed region is less than the distance between the portions of said backing framework and said clamping element adjacent to said rigid clamping channel.

9. A blast-protective window according to claim 8, a space is provided between said stepped surfaces and said rigid clamping channel of substantially U-shaped cross-section.

10. A blast-protective window according to claim 1, wherein said flange is flexible, and further comprising projections attached respectively to an inwardly facing surface of said clamping element and to an inwardly facing surface of said auxiliary backing framework being spaced about 2 to 10 mm apart from upper surfaces of the arms of said rigid clamping channel, whereby when said window is subjected to a blast force said flexible flange bends to absorb a part of the glazing unit energy and after movement the glazing unit is halted by abutment with said projections of said clamping element and said auxiliary backing framework.

11. A blast-protective window according to claim 1, wherein at least a major portion of peripheral common edges of said panels and the reinforcing resin material are sealed together by said adhesive material within said clamping channel, said clamping channel forming an edging fame for said unit.

12. A blast-protective window according to claim 1, wherein said rigid clamping channel is made of a metal.

13. A blast-protective window according to claim 1, wherein said adhesive material is a silicon compound.

14. A blast-protective window according to claim 1, wherein:

the portions of said auxiliary backing framework and of said clamping element at least indirectly supporting said outer faces project toward the outer faces from the window framework at a slant, and upper surfaces of the arms of said rigid clamping channel have complimentary slants so as to effect a locking interengagement with said portions of said auxiliary backing framework and said clamping element.

* * * * *